Jan. 7, 1936.  H. F. MAYNES  2,027,305
FISHING REEL
Filed Dec. 8, 1934  2 Sheets-Sheet 2
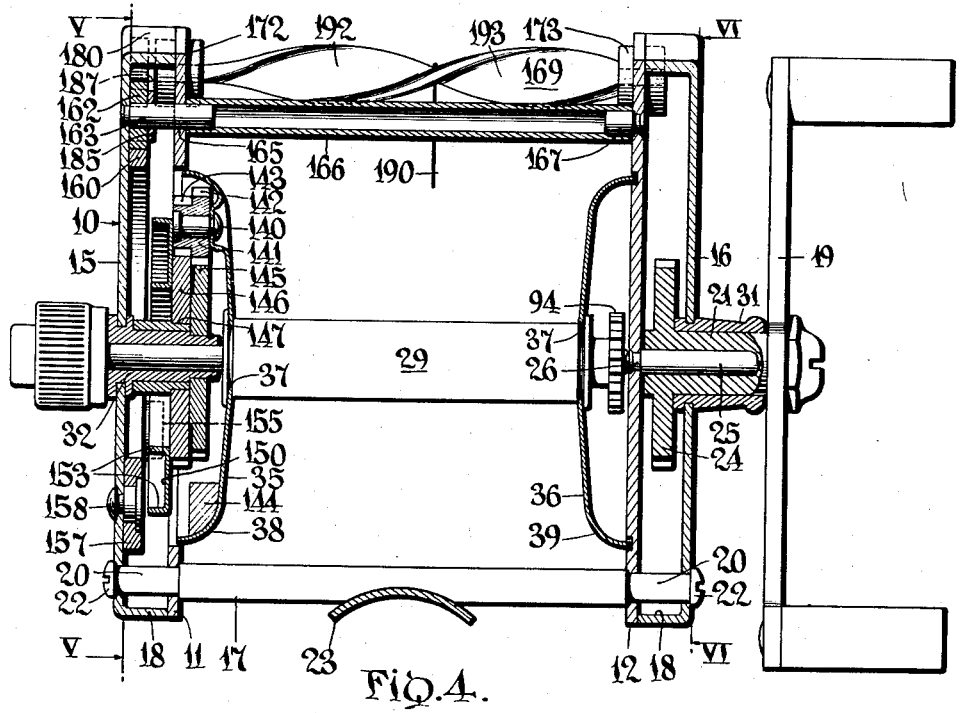
Fig.4.
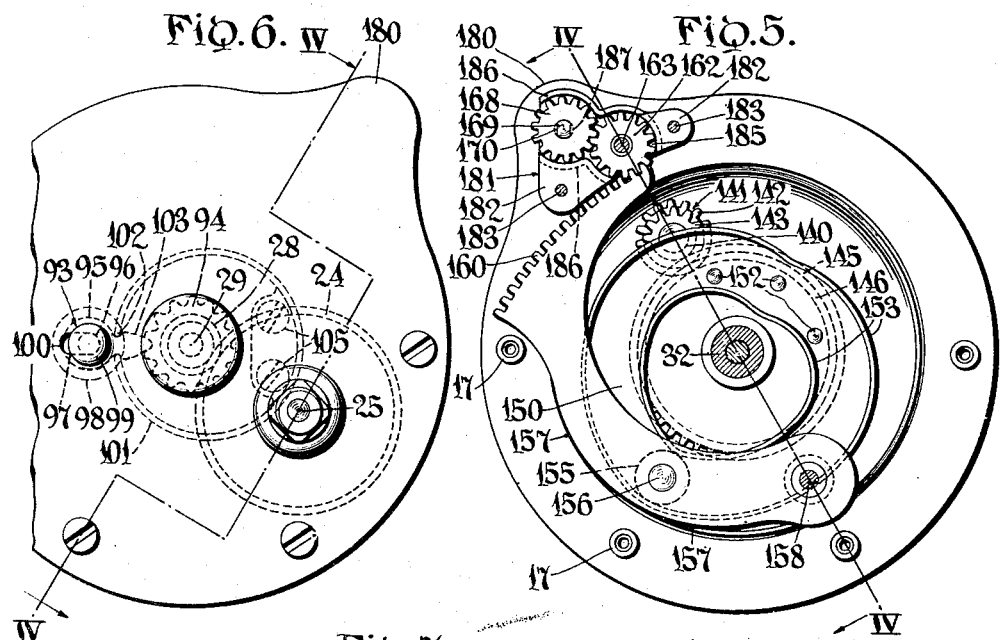
Fig.6.  Fig.5.
Fig.7.
INVENTOR
Hyla F. Maynes,
BY
Beau A Brooks
ATTORNEYS Patented Jan. 7, 1936

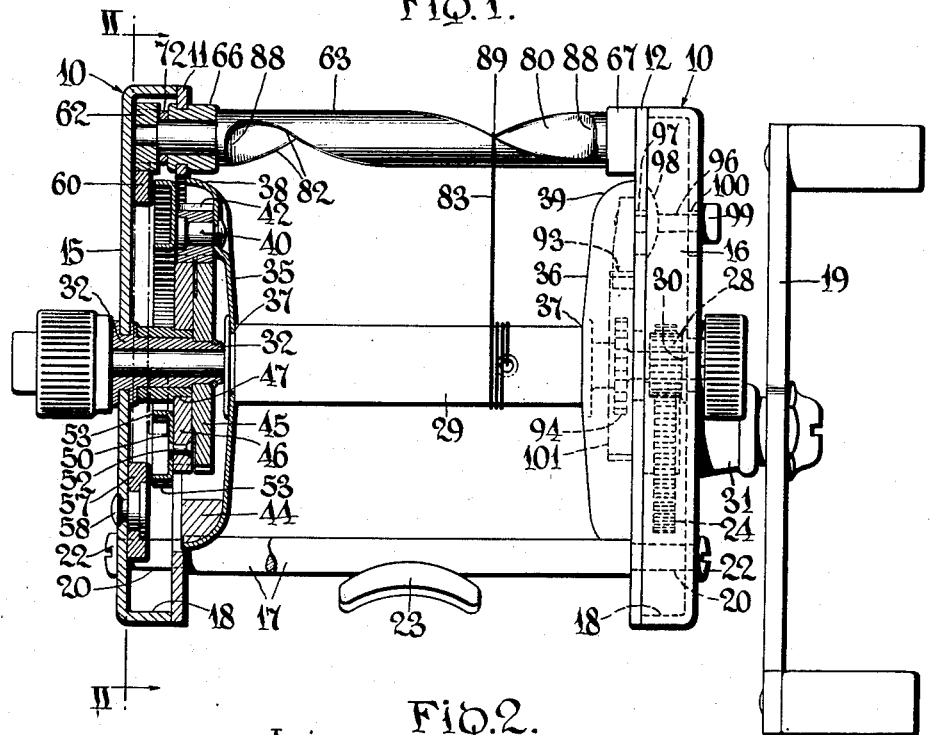

2,027,305

UNITED STATES PATENT OFFICE 2,027,305

FISHING REEL

Hyla F. Maynes, North Tonawanda, N. Y., assignor of one-half to Emma C. Maynes, North Tonawanda, N. Y.

Application December 8, 1934, Serial No. 756,688

17 Claims. (Cl. 242—84.4)

This invention relates to fishing reels and it has particular relation to mechanism designed for operating level wind members of a fishing reel.

One object of the invention is to provide a level wind mechanism which is divided into parts adapted to be disassembled from other portions of reel structure and wherein the parts are so constructed that a predetermined timed relation will always exist upon reassembling the reel parts.

Another object of the invention is to provide an improved and simplified structural relation among spool driving elements of a reel and level wind elements, all of which can be disassembled and certain parts of which are constructed as a removable unit which automatically insures accurate timed relation of the operating elements upon assembling the latter.

Another object of the invention is to provide an improved and simplified structural arrangement among reel spool, operating parts and level wind mechanism to insure minimum wear and maximum efficiency of the reel.

In the type of reel disclosed in my prior Patent No. 1,973,686 of September 11, 1934, an improved level wind mechanism is disclosed which operates satisfactorily, although upon disassembling the reel elements particular attention must be directed to the proper connection of parts in order that the predetermined timed relation of the mechanism may not be altered. The line directing element of the level wind mechanism is in the form of a spiral shaft which is cut approximately half way through its overall thickness in effecting its spiral form, and the spiral extends slightly less than one complete circumferential turn over a distance corresponding substantially to the spool length of the reel.

The spiral shaft is rotated alternately through predetermined degrees of angular movement to provide oscillating motion for the shifting of the fishing line from one end of the spool to the other as the latter is rotated. The shaft oscillates or rotates slowly relative to the speed of the reel, and hence, considerable gear reduction is included to provide the desired rate of oscillation of the shaft.

One of the features of this invention embraces an improved structure for effecting the proper gear reduction between the reel driving members and the level wind shaft, and further embraces a unit including a casing element for supporting in permanently assembled relation a pinion for driving the level wind shaft and a gear element for driving the pinion. The shaft can be withdrawn from the pinion and a cage is provided to confine the pinion against displacement from engagement with its driving gear element. Since these elements rotate very slowly, they will operate properly for much longer periods than the other elements of the reel which rotate at high speed and under ordinary conditions they will not require replacement for the life of the reel.

Another feature of the invention involves an improved distribution of operating parts in the reel structure whereby proper balance is acquired. For example the spool rotating elements can be placed in one end portion of the reel while the level wind mechanism can be placed in the other end without in any way disturbing the efficiency of the reel or the simplicity of structure and operation.

Another feature of the invention is exemplified in the structure of a level wind shaft that has symmetrical spiral surfaces formed by twisting or otherwise shaping a strip of material and either surface is adapted to receive the fishing line in a valley-like contour provided by the spiral edges to prevent lateral displacement of the line in either direction while the shaft is being oscillated and the line is being wound upon the reel. Thus the opposite spiral surfaces can be interchangeably presented to the fishing line for guiding the latter. After one spiral surface of the shaft has been worn, the shaft can be reversed to present the other surface and hence, exceptionally long wear of the shaft is insured.

Referring to the drawings:

Fig. 1 is a side view of a fishing reel, partially in section and partially in elevation, the section being taken substantially along the line I—I of Fig. 2;

Fig. 2 is an end view of the reel with portions of the structure removed and as viewed from the left along the line II—II of Fig. 1;

Fig. 3 is a perspective of a cage for confining a pinion included in the invention;

Fig. 4 is an irregular longitudinal section of a reel having other forms of gear and level wind mechanism, portions of which are shown in elevation, the left end portion of the structure of the figure being taken substantially along the line IV—IV of Fig. 5, and the right end portion of the structure of the figure being taken substantially along the line IV—IV of Fig. 6.

Fig. 5 is an end view of the reel with portions of the structure removed and as viewed along the line V—V of Fig. 4.

Fig. 6 is a fragmentary end view of the reel with portions of the structure removed and as viewed from the right along the line VI—VI of Fig. 4; and Fig. 7 is an end view of the level wind shaft shown in Fig. 4.

In one embodiment of the invention, a reel 10 is provided with mechanism, certain portions of which operate similarly to the mechanism disclosed in my prior patent previously mentioned.

This improved reel comprises a pair of parallel annular heads or end plates 11 and 12 which are assembled with cup shaped end casings 15 and 16, respectively, by means of bracing bars 17 disposed through both the plates and casings adjacent their marginal portions. Inwardly turned flanges 18 of the casings abut the plates 11 and 12 to provide substantially closed housings. End portions 20 of the bracing bars are reduced in diameter to provide proper abutments for the opposed plates 11 and 12, and suitable fastening elements 22, such as screws, threaded axially into the reduced ends 20 of the bars maintain the end plates, casings and bars in rigidly assembled relation.

A pair of the adjacent bars 17 are rigidly secured to a saddle 23 adapted to be mounted upon a fishing rod (not shown) for supporting the reel in a conventional manner, such as that described in the patent above referred to.

A double crank 19 is rigidly secured (Fig. 4) to the outer end of a sleeve 21 formed rigidly or integrally as an axial extension of a driving gear 24 and, together with the gear, is rotatably mounted upon a bearing stud 25 that is rigidly carried, as indicated at 26, in the end plate 12. A boss 31 loosely surrounds or shields the sleeve 21 and is rigidly mounted coaxially thereof in the end wall of the casing 16. A relatively smaller gear 28 engages the gear 24 and is rigidly secured to the end portion of a spool shaft 29 that is rotatable in a bearing support 30 provided in the wall of the casing 16, and also has its other end portion rotatable in a bearing sleeve 32 carried rigidly in the outer wall of the casing 15.

A pair of cupped shells or disks 35 and 36 are secured rigidly upon the spool shaft 29, as indicated at 37, adjacent the plates 11 and 12, respectively, and their outer edges 38 and 39 are curved outwardly in opposite directions toward the plates in such manner as to be disposed substantially flush therewith throughout their circumferential portions, but not interfering with relative rotation between the discs and plates. A stud shaft 40 is secured rigidly in the wall of the disk 35 adjacent its circumferential portion and provides a bearing support for a planet-wheel or relatively small gear 42 rotatably mounted thereon. This small gear meshes with a pair of coaxially disposed relatively larger gears 45 and 46, which have approximately the same diameters, but not the same number of gear teeth. For example, it has been found that if the gear 45 is formed with forty-nine teeth and if the gear 46 is formed with fifty teeth, a suitable ratio is established for purposes of this invention and the slight differences in diameter required for the different number of teeth in the pair of gears does not interfere with proper meshing of the small gear 42 with both the gears 45 and 46. However, it is to be understood that the ratio is not limited to the illustrative example specified.

A counterbalancing weight 44 is secured in the disk 35 at a location diametrically opposite the location of the gear 42.

The gear 45 is rigidly secured upon the inner end of the sleeve 32 and is referred to as a stationary gear or sun-wheel because it is stationarily mounted in conjunction with the supporting reel frame that comprises the end plates, casings and bracing bars. The other gear is rotatably mounted upon a shouldered bearing portion 47 of the sleeve and rigidly carries a cam channel 50 having suitable fastening devices 52 to provide rigid assembly of the gear and channel.

Two equally spaced flanges 53 define the path of the cam channel 50 which is substantially heart shaped, and these flanges receive between them a roller 55 mounted upon a stud shaft 56 that is rigidly carried upon an intermediate portion of a segmental gear arm 57 for oscillating the latter. One end of the gear arm 57 is pivoted upon a pin 58 that is rigidly carried in the wall of the casing 15, and the other end of the gear arm is provided with a gear segment 60 which engages a pinion 62 carried non-rotatably upon one end of a level wind rotatable shaft 63. It will be observed that the end of the level wind shaft is substantially D-shape in cross section and fits into an opening 65 of the same shape in the pinion. Opposite end portions of the level wind shaft are mounted in bearing sleeves 66 and 67 carried rigidly in the plates 11 and 12, respectively.

The segment 60 is prevented from becoming disengaged from the pinion 62, when the casing 15 is removed, by means of the flange 18 which is in the path of movement of the segment ends beyond predetermined limits of oscillation. In disassembling the casing 15 the segment 60 and pinion 62 remain mounted in the casing in the same relation. Even though the gears 42, 45 and 46 are disassembled from the sleeve 32, which is rigidly carried by the casing, the reassembling is always in the same relation, and, hence, the timing of the various gear members is not disturbed in the entirely reassembled structure. It should be understood that other types of stops could be provided in the casing 15 to prevent the segment 60 from disengaging the pinion 62.

A cage 68 is provided with securing flanges 69, rigidly secured, as indicated at 70, to the casing 15 wall and an intermediate offset wall 72 of the cage is spaced in parallel relation from the wall of the casing 15 by means of curved integral walls 73. Referring to Figs. 2 and 3 it will be apparent that the curvature of the walls 73 corresponds closely to the peripheral curvature of the pinion 62 and the periphery of the pinion is slightly spaced from the inner surfaces of these walls. Therefore, the cage permanently confines the pinion 62 in engaging relation with the gear segment 60 in order that the proper timed relation between the gears 42, 45, and 46 and the cam drive through the segment may not be disturbed. The remainder of the operating elements can be disassembled from the unit including the gear segment arm 57, pinion 62 and their supports for purposes of cleaning and replacement of parts. Then in assembling the level wind shaft with the pinion 62 the shaft end of D-shape cross section is inserted through the bearing sleeve 66, through an opening 74 in the cage wall 72, and slidably into the D-shaped opening 65 of the pinion, and thus, is mounted always in the same relation thereto and to the other gear elements.

A spiral cut 80 extending substantially the distance between the disks 35 and 36 traverses approximately seven-eighths of a turn about the circumference of the shaft 63 and the cut extends approximately one-half the distance through the shaft with respect to its overall thickness or diameter.

As explained in my prior patent mentioned above, the wall of the cut, at a typical cross section thereof slopes slightly toward the periphery of the shaft and rounded wall edges 82 are formed to complete the desired face contour of the spiral cut. In outline the cross sectional contour of the spiral shaft is substantially semicircular.

When the crank 19 is rotated in a counterclockwise direction, as viewed in Fig. 2, the gears 24 and 28 are operated to rotate the spool shaft 29 which carries the disk 35 and gear 42 mounted thereon in similar rotative movement, and the spool shaft rotation is in such direction as to wind a fishing line 83 thereon. During this rotation the bodily movement of the gear 42 about the circumference of the stationary gear 45 causes a relatively slow rotation of the gear 46 because of the 49 to 50 ratio between the gears 45 and 46. In response to the rotation of the gear 46 the cam roller 55 travels about the cam channel 50 to oscillate the segmental gear arm 57. It will be observed that the cam channel 50 is provided with a high point 85 and a low point 86.

When the cam gear 46 is rotated in either direction, the roller 55 travels uniformly and continuously from the low point to the high point, and vice versa, of the cam channel to move the gear segment 57 in predetermined cycles of oscillation. The cam channel 50 and gears are so proportioned that the movement from the high point to the low point, or from the low point to the high point, causes approximately seven-eighths of a complete revolution of the pinion 62 and, consequently, of the spiral level wind shaft 63.

Since the spiral cut 80 traverses approximately seven eighths of the circumference of the shaft 63, the fishing line 83 lying upon the surface of the shaft defining the cut in the manner shown in Fig. 1, will be shifted by the spiral portion of the shaft from side to side in response to, and according to the direction of, oscillatory movement of the pinion 62 and gear segment 60. The spiral surface in fact provides a cam like action upon the line in shifting it.

The ends of the spiral cut are sloped outwardly, as indicated at 88, toward the ends of the shaft 63 into the circular periphery of the latter to prevent accidental slipping of the line from the end portions of the shaft, although, under ordinary conditions, the reverse turning movement of the spiral shaft after shifting the line toward one shaft end, will automatically start the shifting of the line in the opposite direction. This operation occurs incidentally to each cycle of oscillation of the spiral shaft and regardless of whether the reel crank is rotated in a clockwise or counterclockwise direction. In certain types of reels the spool can be disengaged from the manually operated crank driving gear by suitable conventional disengaging devices (not shown) and in incorporating the improved level wind mechanism of this invention in such types of reels, it is to be understood that this improved level wind mechanism will continue to function as long as the spool rotates and will remain in properly timed relation therewith. Therefore, regardless of the cranking gear, the fishing line will always be wound or unwound in the same relation upon or from the spool.

It should be understood that the line 83 contacts the spiral surface 80 in its movement from side to side at a location approximately half way through the overall diameter of the spiral shaft, and that the line is urged axially along the shaft by one of the rounded edges 82 in one direction of shaft rotation, while it is held against over running by the outer rounded edge 82. This action occurs regardless of the direction of rotation of the spiral shaft until the line reaches the reversing slopes 88. Thus the rounded edges 82 of the spiral surface, as viewed from the direction of the spool along the fishing line resting upon such surface, constitute converging guides at approximately the apex 89 of which the line is disposed for level winding upon the spool. In other words, a shifting valley-like track for the line is formed by the spiral edges and the line always tends to remain at the shifting apex or bottom of the track which is approximately across the axis of the spiral shaft.

In this connection, it is to be further understood that the axis of the level wind shaft 63 may not be at the location defining the depth of the spiral. For example, the surface of the shaft defining the depth of the spiral can be spaced an appreciable distance from the shaft axis.

A suitable clicker mechanism 93 is incorporated in the structure and includes a ratchet gear 94 that is rigidly mounted upon the spool shaft 29 between the end plate 12 and the disk 36, and a two-way cam pawl 95 is pivoted (Fig. 6) upon a bolt or pin 96 that is slidably mounted in a slot 97 formed in the end plate 12. A collar or flange 98 formed on the pin 96 slides adjacent the slot upon the side of the end plate opposite the pawl, and an end portion of the pin having a finger piece 99 thereon extends through a slot 100 in the casing 16 in order to be accessible for manual actuation of the pawl into and out of engagement with the ratchet gear. A split ring 101 of resilient material has its split portion 102 engaging opposite faces of the cam head 103 of the pawl, and the ring has its diametrically opposite portion secured, as indicated at 105, to the surface of the end plate 12.

In the form of the invention shown in Figs. 4, 5, and 6 all of the frame and supporting portions of the reel 10, and certain other features of the structure are substantially the same as those previously described, and hence, corresponding reference characters are employed to designate like parts which have been described. In this construction a stud shaft 140 is secured rigidly in the wall of the disk 35 adjacent its circumferential portion and provides a bearing support for a relatively small rotatable gear member 141 in the form of two rigidly connected coaxial gears 142 and 143 of different diameters.

These gears 142 and 143 mesh with a pair of coaxially disposed relatively larger gears 145 and 146 of different diameters. In the other arrangement of gears 45 and 46 shown in Fig. 1, the ratio between the number of teeth is approximately 49 to 50, whereas, in the construction just described the ratio between the number of teeth can be selected within relatively wide limits depending upon the relative sizes of the gears 142 and 143, as well as the relative sizes of the gears 145 and 146, and to accommodate any type or size of reel that is manufactured. A counterbalancing weight 144 is secured to the disk 35 at a location diametrically opposite the location of the gear member 141.

The gear 145 is rigidly secured upon the inner end of the sleeve 32 and is referred to as a stationary gear because it is stationarily mounted in conjunction with the supporting reel frame that comprises the end plates, casings and bracing bars. The other gear 146 is rotatably mounted upon a shouldered bearing portion 147 of the sleeve and rigidly carries a cam channel 150 having suitable fastening devices 152 to provide the rigid assembly of the gear and channel.

Two equally spaced flanges 153 define the path of the cam channel 150 which is substantially heart shaped, and these flanges receive between them a roller 155 mounted upon a stud shaft 156 that is rigidly carried upon an intermediate portion of a segmental gear arm 157 for oscillating the latter. One end of the gear arm 157 is pivoted upon a pin 158 that is rigidly and permanently carried upon the wall of the casing 15, and the other end of the gear arm is provided with a gear segment 160.

An intermediate pinion 162 is permanently journalled upon a stud shaft 163 that is rigidly secured in the wall of the casing 15 and the inner end of this shaft normally extends through an opening 165 formed in the end plate 11. The pinion 162 and segmental gear section 160 are normally engaged. This inner end of the stud shaft serves as a bearing rotatably supporting one end of a roller 166 extending parallel to the spool 29 and having its other end rotatably supported upon a short pin 167 secured in the end plate 12.

The intermediate pinion 162 constantly meshes with a pinion 168 which is normally carried non-rotatably but in slidable relation upon one end of a level wind rotatable spiral shaft 169 and the end of the shaft has a cross sectional contour corresponding to the area between two parallel chords of a circle spaced equi-distant from the center of the circle. An opening 170 in the pinion 168 having the same shape as the end of the shaft 169 slidably receives the latter. Opposite end portions of the spiral shaft 168 are mounted in bearing sleeves 172 and 173 carried rigidly in the plates 11 and 12, respectively. In order to provide proper outward spacing of the pinion 168 peripheral extensions 180 are formed upon the end plate 11 and casing 12 to receive this pinion.

A cage 181 functioning similarly to the cage 68, is provided with flanges 182 rigidly secured, as indicated at 183, to the casing wall, and an intermediate offset wall 185 of the cage is spaced in parallel relation from the wall of the casing 15 by means of curved integral wall portions 186. The curvature of the wall portions 186 correspond closely to the peripheral curvature of the pinions 162 and 168 and the peripheries of these pinions are slightly spaced from the inner surfaces of these wall portions.

Therefore, the cage permanently confines the pinions 162 and 168 in engaging relation with each other and the gear segment constantly engages the pinion 162 in order that proper timed relation between the gears 142, 143, 145, 146 and the cam drive through the segment 160 to the pinions 162 and 168 may remain constant. Then in assembling the level wind shaft 169 with the pinion 168 the shaft end of the peculiar cross section specified is inserted through the bearing sleeve 172, through an opening 187 in the cage wall 185, and thence slidably into the opening 170 of the pinion, and thus, is always mounted in the same relation thereto and to the other gear elements of the reel. The segment 160 is prevented from being disengaged from the intermediate pinion 162, when the casing 15 is removed, by means of the flange 18 which is in the path of movement of the segment ends beyond predetermined limits of oscillation.

The spiral shaft 169 is formed of a single strip of metal and in one form can be twisted approximately seven-eighths of a turn about the shaft axis. The edges of the spiral shaft are rounded to provide smooth engagement with a fishing line 190 and opposite surfaces 192 and 193 of the shaft defining the spiral contour thereof are spaced equally from the shaft axis in order to provide the like surface contours. That is, the opposite surfaces 192 and 193 of the spiral are symmetrical and function in the same manner. Hence, in inserting the end of the spiral shaft into the pinion 168 it is immaterial as to which side of the spiral shaft is presented for engagement with the fishing line. In other words this spiral shaft has two surfaces either of which functions in substantially the same manner as the single spiral surface 80 described in connection with Figs. 1 to 3. Further description as to the operation of the spiral shaft is therefore unnecessary.

The two pinions 162 and 168 are provided in order to locate the spiral shaft 169 at sufficient distance from the spool 29 to provide for properly positioning the roller 166 over which the fishing line is trained, and which is offset from a straight line from any of the various locations of the fishing line on the spool to the shaft 169. Therefore, the line 190 will always be trained over the roller to the shaft 169 at the same angle or in the same direction, regardless of whether the line has been substantially entirely unwound from the spool or whether it has been reeled in and substantially fills the spool.

From the foregoing description, it will be apparent that the invention involves a structure in which the level wind spiral shaft operates efficiently without imposing appreciable drag upon the reel gears and which is extremely simple and positive in its operation. Each of the spiral reversible shafts 63 and 169 is geared down greatly from the crank speed of the reel, and hence, does not interfere with the line when it is played out very rapidly incidental to casting. The structure, therefore, tends to increase the casting distance over the conventional types of reels and facilitates the reeling-in operations. The proper timed relation between the reel gearing and level wind shaft gearing is maintained by virtue of the fact that even in disassembled relation of the reel, either of the gear segments 60 or 160 is maintained in engagement with the shaft driving pinion 62 or 162 and the shaft must always be assembled in the same relation with the pinion.

Although seven-eighths of a revolution of either one of the level wind shafts 63 and 169 has been designated as desirable for proper level winding of the fishing line in the construction described, it is to be understood that the spiral cut or twist in the shaft can be made more or less than seven-eighths of the shaft circumference and then the timing of the mechanism can be altered to provide the proper shaft rotation which may also be more or less than seven-eighths of a revolution in a given direction.

Although more than one form of the invention has been shown and described in detail, it will be apparent to those skilled in the art that the invention is not so limited, but that various changes may be made therein without departing from the spirit of the invention or from the scope of the appended claims.

It is claimed:

1. In a fishing reel structure, a rotatable device for winding a fishing line upon the reel structure, a level wind shaft for guiding the line from end to end of the shaft during winding operations, a pair of gears, one gear having more teeth than the other gear, means for supporting one gear in a stationary position in the reel structure, means for rotatably supporting the other gear in the reel structure, a pinion carried by the rotatable device and movable about the circumferences of the pair of gears in engagement therewith for rotating the rotatable gear at a speed less than the speed of the rotatable device, and means connected to the rotatable gear and to the level wind shaft for driving the latter at reduced speed.

2. In a fishing reel including a frame structure, a stationary gear rigidly mounted in the frame structure, a rotatable gear disposed axially of the stationary gear and having a supporting bearing in the frame structure, said gears having approximately equal diameters, one gear having more teeth than the other gear, a driving gear concurrently engaging both gears, means for rotating the driving gear bodily about the circumferences of the other two gears in engagement therewith to drive the rotatable gear at reduced speed, an oscillatable level wind shaft journalled in the frame structure for guiding a fishing line, and means for transmitting motion from the rotatable gear to the level wind shaft.

3. In a fishing reel including a frame structure, a stationary gear rigidly mounted in the frame structure, a rotatable gear disposed axially of the stationary gear and having a supporting journal in the frame structure, one gear having more teeth than the other gear to provide a predetermined gear ratio, gear means concurrently engaging both gears, means for bodily rotating the said gear means circumferentially of the other two gears in engagement therewith to drive the rotatable gear at reduced speed, a cam track provided on the rotatable gear, an oscillatable level wind shaft journalled in the frame structure and having a pinion mounted thereon, an arm pivotally mounted in the frame structure and having a gear segment thereon engaging the pinion, and means connecting the arm to the cam track for transmitting oscillatory motion from the cam track to the level wind shaft.

4. In a fishing reel including a frame structure, a stationary gear rigidly mounted in the frame structure, a rotatable gear disposed axially of the stationary gear and having a supporting bearing in the frame structure, said gears having approximately equal diameters, one of said gears having a greater number of teeth than the other gear, gear means concurrently engaging both gears, means for bodily rotating said gear means circumferentially of said gears in engagement therewith to drive the rotatable gear at reduced speed, a cam channel provided on the rotatable gear, a level wind shaft journalled in the frame structure and having a pinion mounted thereon, a gear segment engaging said pinion and having a journal mounting on the frame structure, a roller mounted on the gear segment and engaging the cam channel to transmit oscillatory motion from the cam channel to the level wind shaft.

5. A fishing reel including a frame structure, a stationary gear rigidly mounted in the frame structure, a rotatable gear disposed axially of the stationary gear and having a supporting journal in the frame structure, said gears having predetermined gear ratio diameters, one gear having more teeth than the other gear, driving gear members engaging both the other gears, means for rotating the driving gear members bodily about the circumference of the other gears in engagement therewith to drive the rotatable gear at reduced speed, a level winding device rotatable in the frame structure, and means for connecting said gears to the level winding device.

6. In a fishing reel including a frame structure, a stationary gear rigidly mounted in the frame structure, a rotatable gear disposed axially of the stationary gear and having a supporting bearing in the frame structure, driving gear means concurrently engaging both of said gears and having different gear ratios with respect to the latter, means for rotating the driving gear means bodily about the circumferences of the other gears in engagement therewith to drive the rotatable gear at reduced speed, level wind mechanism mounted in the frame structure for guiding a fishing line, means for driving said mechanism from the rotatable gear, and means for maintaining a predetermined timed relation between the level wind shaft and all of said gears.

7. In a fishing reel including a frame structure, a stationary gear rigidly mounted in the frame structure, a rotatable gear disposed axially of the stationary gear and having a supporting journal bearing in the frame structure, driving gear means concurrently engaging both of said gears and having different gear ratios with respect to the latter, means for rotating said driving gear means bodily about the circumferences of the other two gears in engagement therewith to drive the rotatable gear at reduced speed, a level wind shaft journaled in the frame structure for guiding a fishing line, a pinion slidably and non-rotatably mounted upon the level wind shaft, mechanism connected to the pinion and detachably connected to the rotatable gear for transmitting driving force to the shaft, and means for permanently maintaining the mechanism engaged with the pinion regardless of whether the mechanism is detached from the rotatable gear.

8. In a fishing reel including a frame structure, a spool rotatably mounted in the frame structure, a stationary gear rigidly mounted in the frame structure, a rotatable gear disposed axially of the stationary gear and having journal support in the frame structure, driving gear means concurrently engaging both of said gears and rotatable bodily about the circumferences of said gears in engagement therewith to drive the rotatable gear, a level wind mechanism having a driving connection with the rotatable gear, said gears and gear means being disposed adjacent one end of the spool in one end portion of the frame structure, spool operating gearing including a crank member mounted in the other end of the frame structure and operatively connected to the spool for rotating the latter.

9. A fishing reel comprising a frame structure, a spool rotatable in the frame structure for receiving a fishing line wound thereon, a level wind shaft journalled in the frame structure and having means for guiding a fishing line in predetermined wound relation upon the spool as the latter is rotated, a level wind driving mechanism mounted in the frame structure and having driving connection to the level wind shaft, means for operating said mechanism, and a member mounted in the frame structure parallel to the level wind shaft for directing the fishing line in a constant direction upon said level wind shaft regardless of whether the spool is substantially full or substantially empty.

10. A fishing reel unit comprising a section, a gear elements having a bearing securing it permanently upon the section, a pinion engaging the gear element, means for maintaining the gear element and pinion permanently assembled with the section, means for detachably and non-rotatably connecting a level wind shaft to the pinion, and means for detachably mounting the section in operative relation in a fishing reel structure.

11. A fishing reel unit comprising a section, a gear element having a bearing securing it permanently upon the section, a pinion engaging the gear element, means permanently carrying the pinion upon the section in engagement with the gear element, means for detachably and non-rotatably connecting a level wind shaft to the pinion, and means for detachably mounting the section in operative relation in a fishing reel structure.

12. A fishing reel unit comprising a section, a gear element having a bearing securing it permanently upon the section, a pinion engaging the gear element, a cage permanently carried by the section and confining the pinion in engaging relation with the gear element, means for detachably and non-rotatably connecting a level wind shaft to the pinion, and means for detachably mounting the section in operative relation in a fishing reel structure.

13. A fishing reel unit comprising a frame section, a gear element having a bearing securing it permanently upon the section, a pinion engaging the gear element, a cage permanently carried by the section and confining the pinion in constantly engaging relation with the gear element, means for detachably and non-rotatably connecting a level wind shaft to the pinion, means for detachably mounting the section in operative relation in a fishing reel structure, and means for limiting movement of the gear element to prevent the latter from disengaging the pinion.

14. In a fishing reel having means for winding a fishing line thereon, a level wind spiral shaft for guiding the fishing line alternately from end to end of the reel, the spiral shaft having opposite symmetrical spiral surfaces, either spiral surface presenting a shifting valley-like contour extending to points adjacent the axis of the shaft to receive a fishing line whereby the latter is prevented from being displaced laterally in either direction from the valley-like contour.

15. In a fishing reel having means for winding a fishing line thereon, a level wind spiral shaft in the form of a twisted strip of material for guiding the fishing line alternately from end to end of the reel, the shaft having opposite symmetrical spiral surfaces, either spiral surface presenting a shifting valley-like contour extending to points adjacent the axis of the shaft to receive a fishing line whereby the latter is prevented from being displaced laterally in either direction from the valley-like contour.

16. In a fishing reel having means for winding a fishing line thereon, a level wind spiral shaft in the form of a twisted strip of material, said shaft presenting converging surfaces incidental to its spiral configuration for guiding a fishing line from end to end of the reel in levelly wound relation.

17. A fishing reel comprising a frame structure, a spool rotatable in the frame structure for receiving a fishing line wound thereon, a level wind member journalled in the frame in substantially parallel relation to the spool and having a guiding portion constantly contacting the fishing line to guide the latter in predetermined wound relation upon the spool as the line engages said guiding portion from a given direction incidental to the operation of the reel, a level wind driving mechanism mounted in the frame structure and having driving connection with the level wind member, means for operating said mechanism, and a device mounted in the frame structure between said guiding portion and spool and coacting with said guiding portion for constantly maintaining in substantially the same plane the portion of the line between the level wind member and said device.

HYLA F. MAYNES.